Feb. 1, 1938. C. H. WILD 2,107,170
CASING MACHINE
Filed Jan. 14, 1936 13 Sheets-Sheet 5

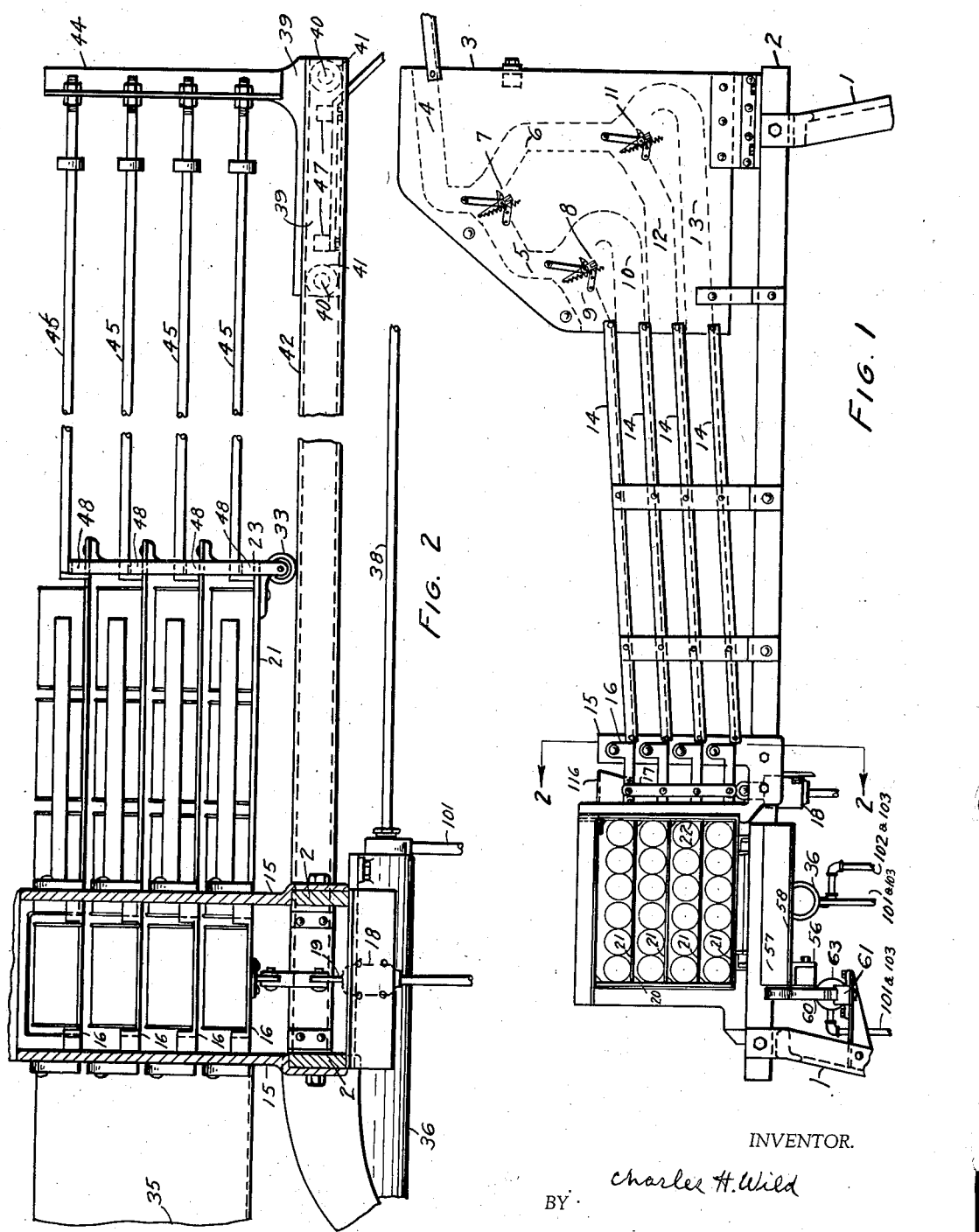

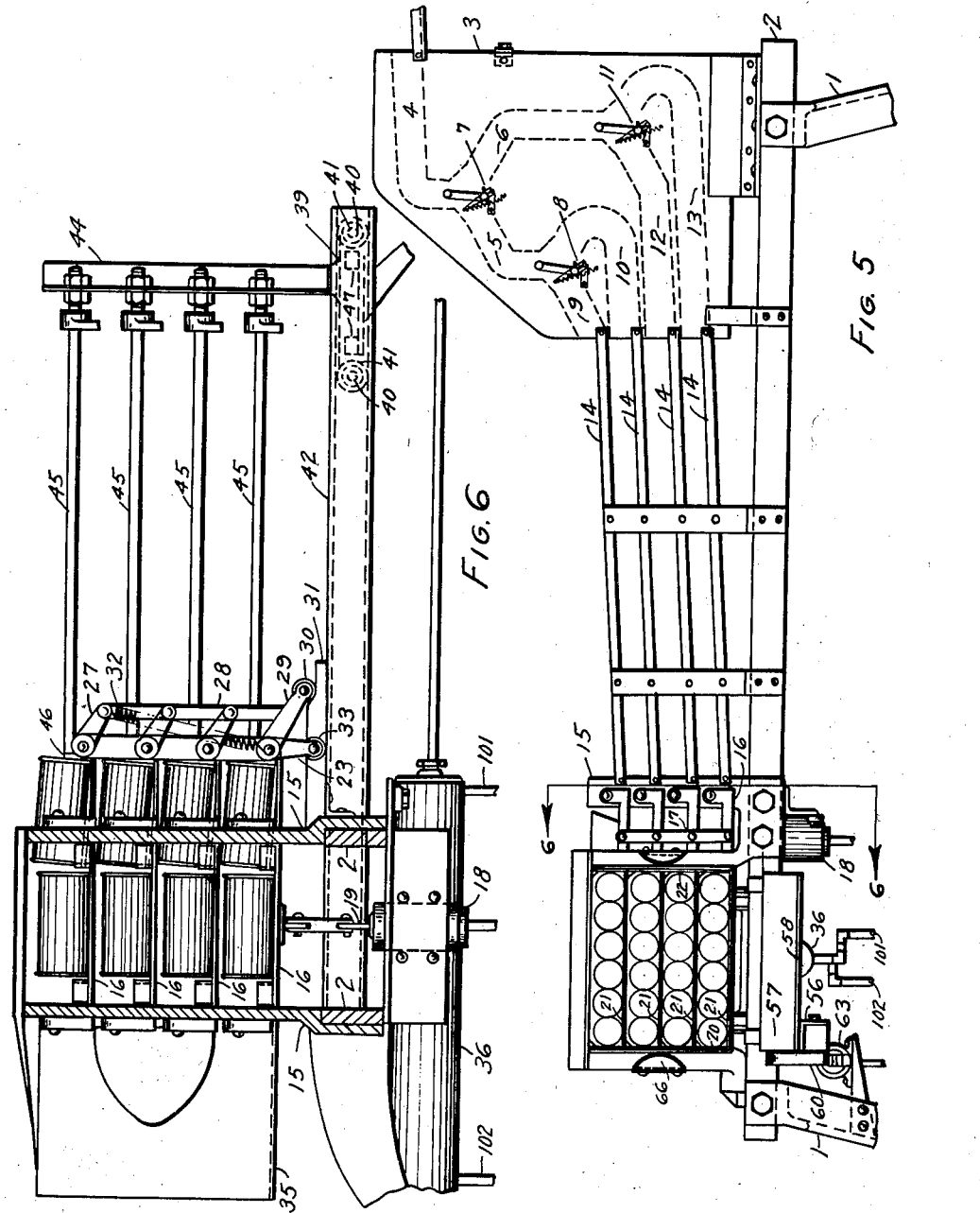

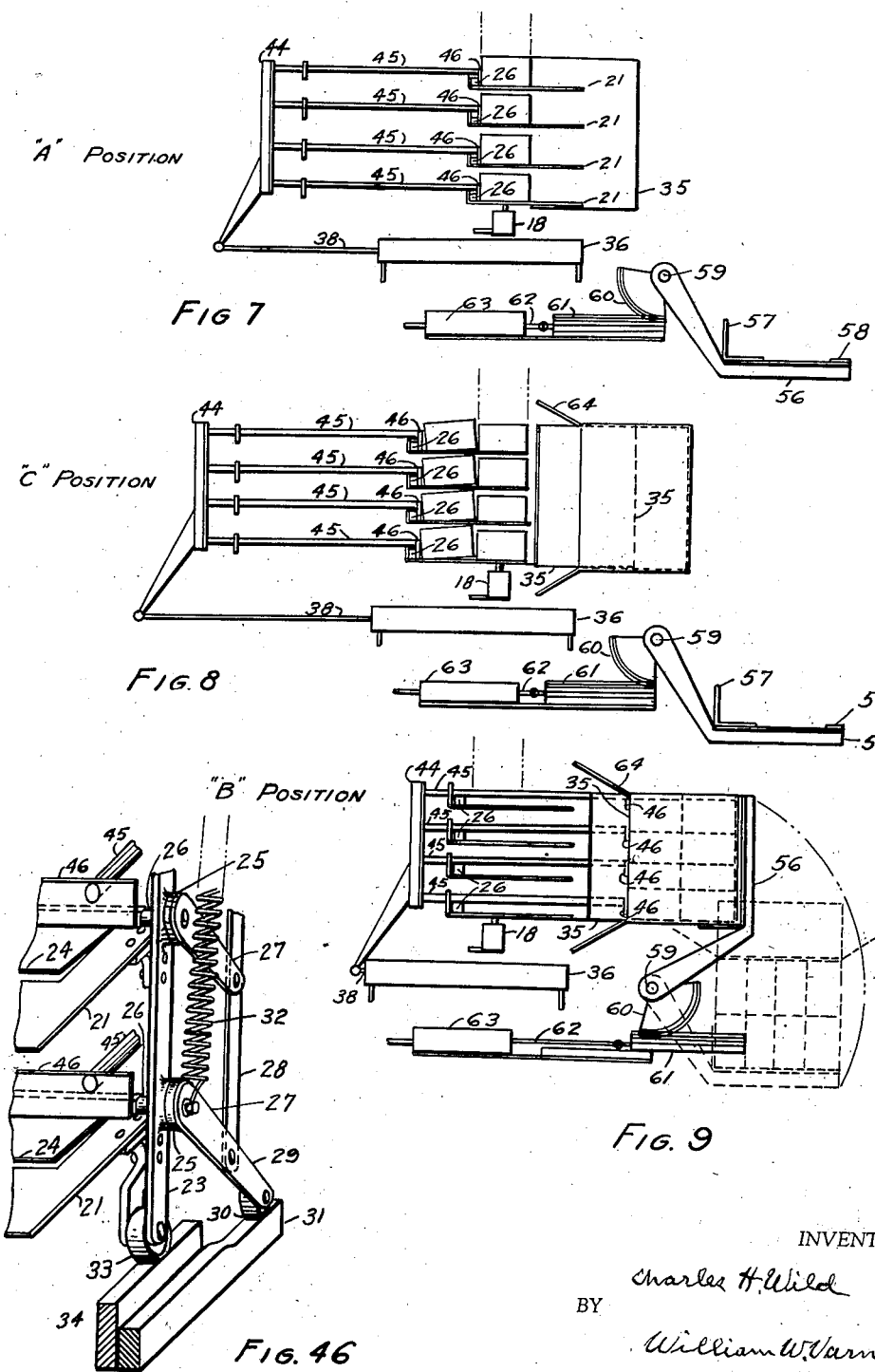

INVENTOR.
Charles H. Wild
BY
William W. Varney
ATTORNEY.

Feb. 1, 1938.   C. H. WILD   2,107,170
CASING MACHINE
Filed Jan. 14, 1936   13 Sheets-Sheet 6

INVENTOR.
Charles H. Wild
BY
William W. Varney
ATTORNEY.

Feb. 1, 1938.                C. H. WILD                 2,107,170
                          CASING MACHINE
                       Filed Jan. 14, 1936         13 Sheets-Sheet 7

INVENTOR.
Charles H. Wild
BY
William W. Varney
       ATTORNEY.

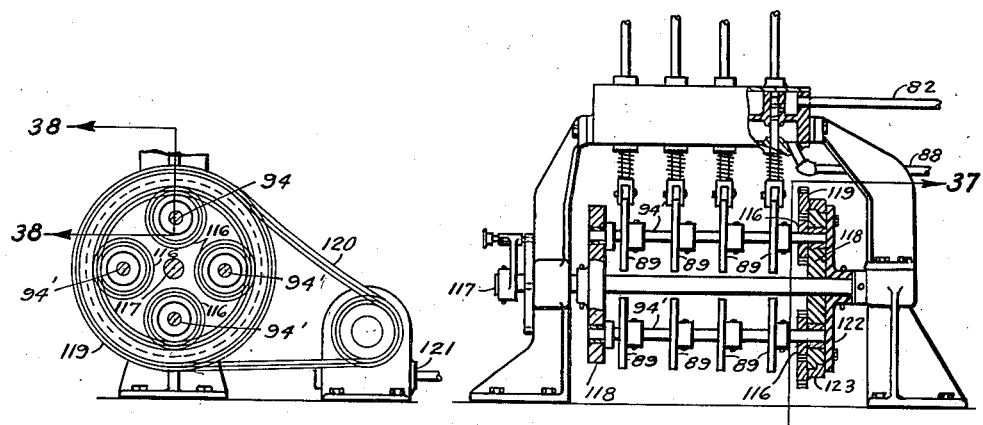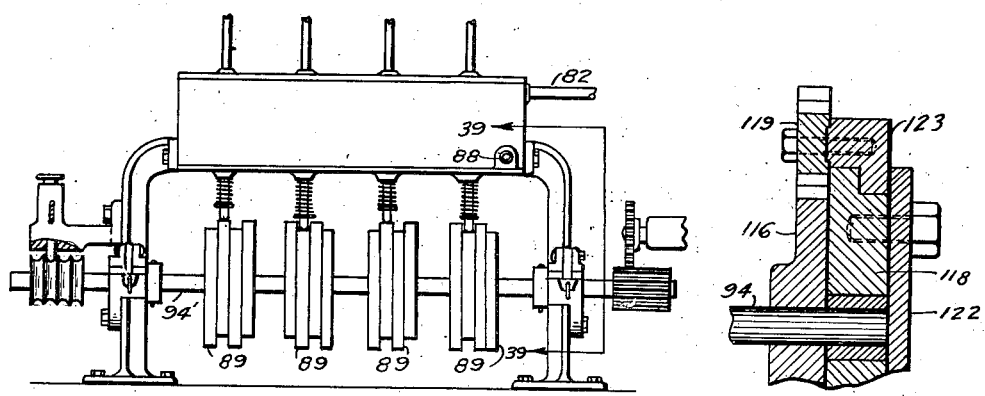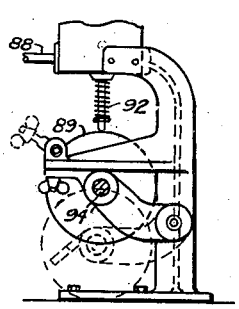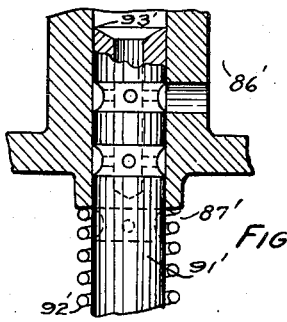

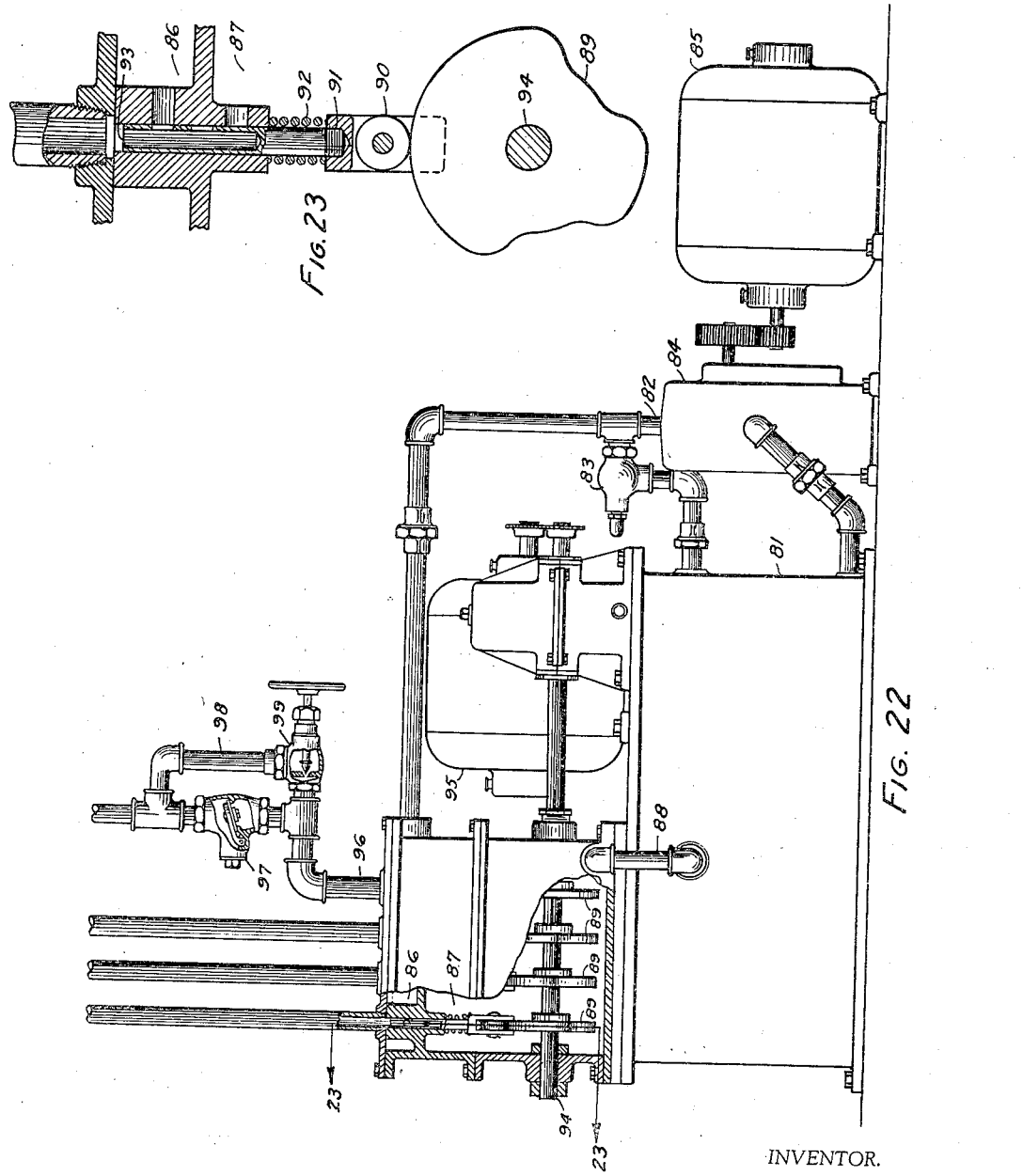

Feb. 1, 1938.  C. H. WILD  2,107,170
CASING MACHINE
Filed Jan. 14, 1936   13 Sheets-Sheet 10
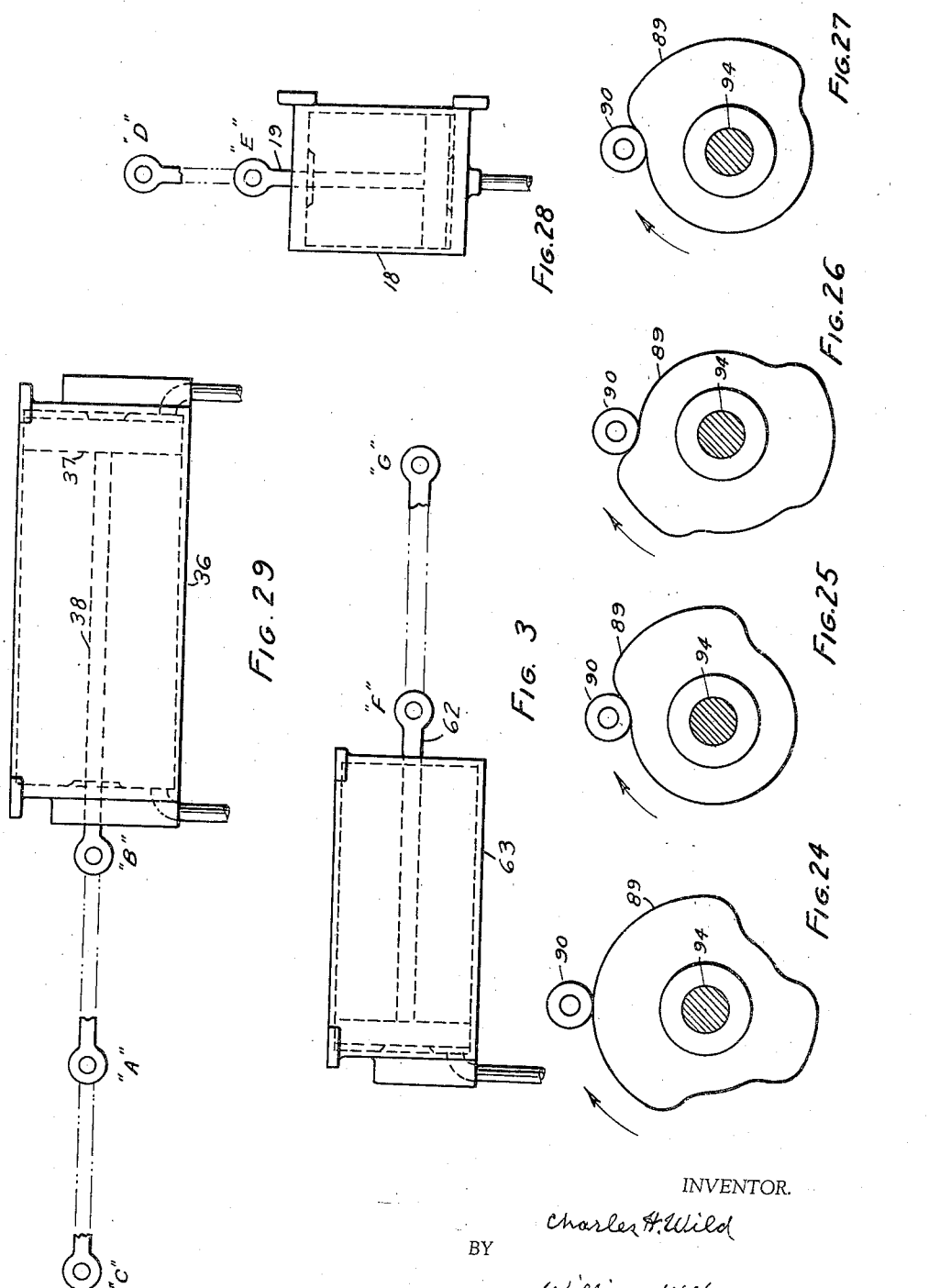
INVENTOR.
Charles H. Wild
BY
William W. Carney
ATTORNEY.

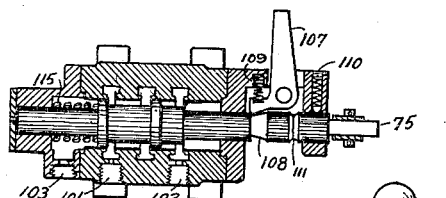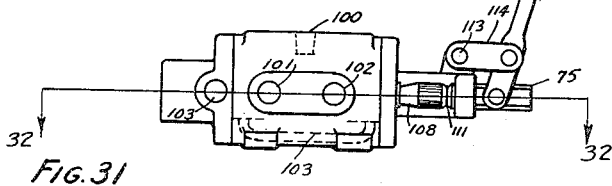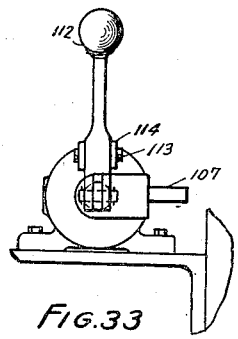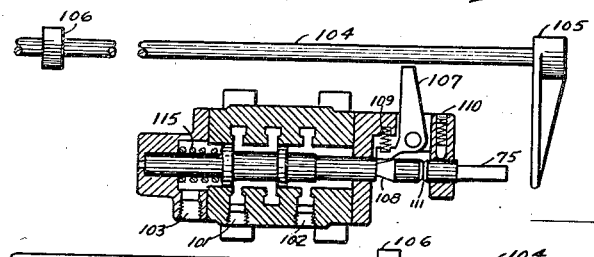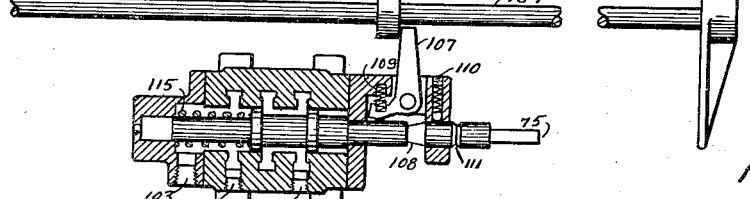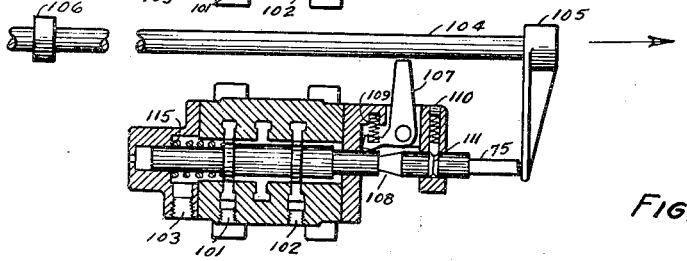

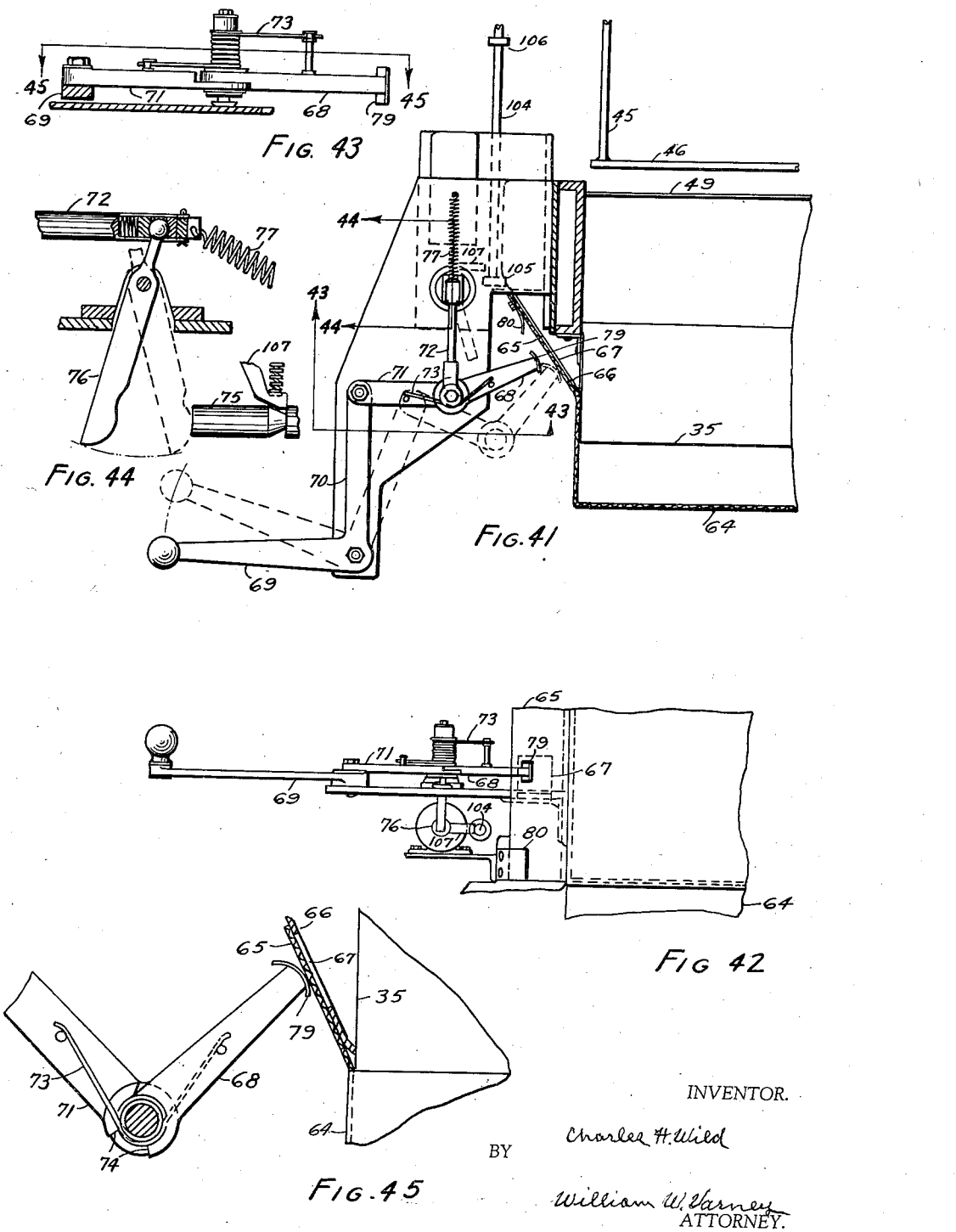

Feb. 1, 1938. C. H. WILD 2,107,170
CASING MACHINE
Filed Jan. 14, 1936 13 Sheets-Sheet 13
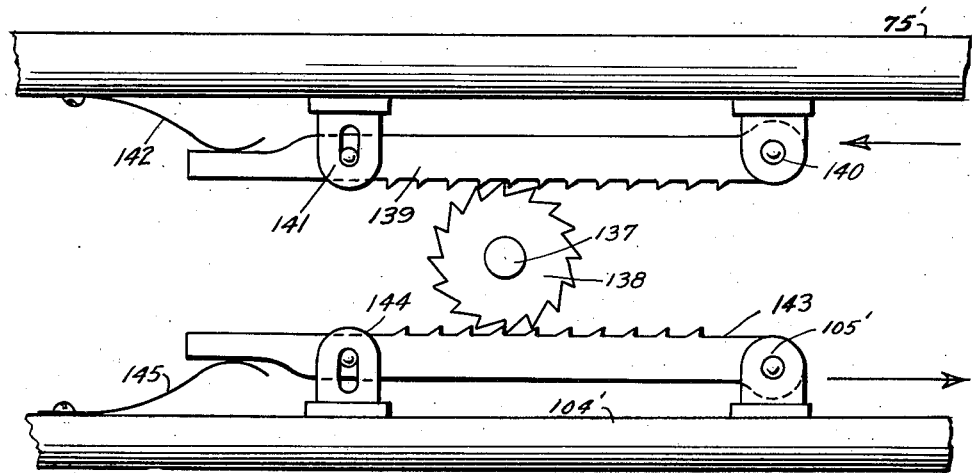
FIG. 49
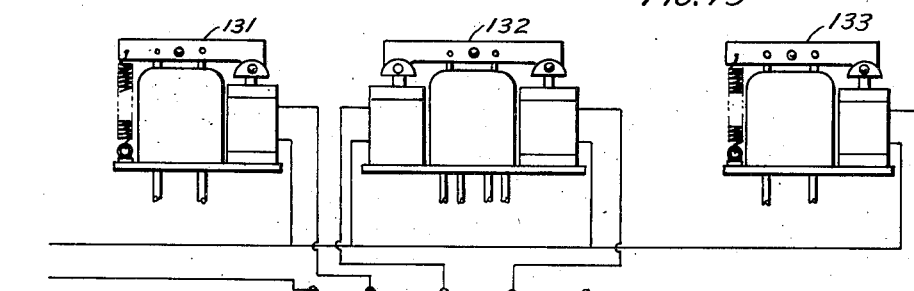
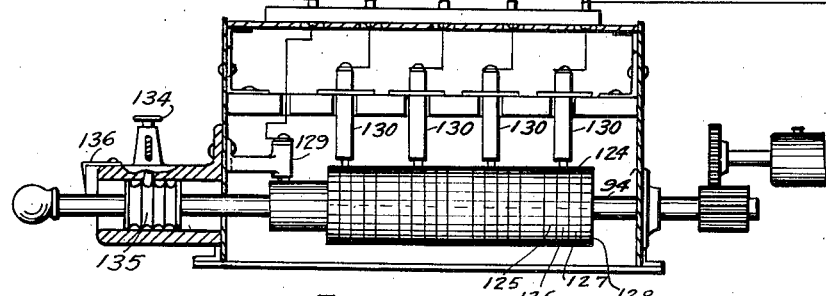
FIG. 48
INVENTOR.
Charles H. Wild
BY
William W. Varney
ATTORNEY.

Patented Feb. 1, 1938

2,107,170

UNITED STATES PATENT OFFICE 2,107,170

CASING MACHINE

Charles H. Wild, Baltimore, Md., assignor to Burt Machine Company, Incorporated, Baltimore, Md., a corporation of Maryland Application January 14, 1936, Serial No. 59,026

20 Claims. (Cl. 226—15)

I am aware that there are many types of casing machines for various uses. There are many types of hand-operated and power-actuated machines for casing goods of various kinds.

The object of this invention is the production of a casing machine having many improved features over existing machines for similar purposes.

A further object of my invention is the production of a casing machine of the hydraulic type having centralized timing and control elements.

A further object of my invention is an improved casing machine adapted to case single rows of cans in a container, or any number of rows desired within the range of the machine constructed.

A further object of my invention is an improved casing machine adapted to case single rows of cans in a container, or any number of rows desired within the range of the machine constructed, and selective means for adjusting the machine for casing cans in the desired number of rows in a container, as may be predetermined.

A further object of my invention is the construction of a casing machine operated by a central control mechanism operating by means of a non-compressible fluid whereby a definite and predetermined action may be obtained.

A further object of my invention is an improved casing machine provided with automatic controls for non-compressible fluid operated mechanism.

A further object of my invention is an improved means in a casing machine for maintaining the carton to be filled in position in the machine and the control of the machine thereafter during the filling and discharge of said carton from said machine.

At this point, I would like to call attention to the fact that hydraulically controlled casing machines are new in the art, and that a further object of my invention is the arrangement of timed hydraulically-operated mechanism for casing goods, either in single or plural rows.

A further object of my invention is the providing in a casing machine an improved means for holding the case in position while being filled, and for operating said means; whereby the speed of upward movement of said case-holder after the case has been placed in position thereon may be regulated and after the case is filled its speed of removal may be adjusted and controlled.

With the foregoing and other objects in view, my invention consists of the methods employed, combination and arrangement of apparatus and means as hereinafter specifically set forth and illustrated in the accompanying drawings, wherein is shown the preferred embodiment of my invention; but it is understood that changes, variations and modifications may be resorted to which come within the scope of the claims hereunto appended.

In the drawings of the herein-described embodiment of my invention, Figure 1 represents a diagrammatic view in elevation of a casing machine, particularly showing the chutes, the control for the chutes and the runway and shelves of the can-holding rack adapted to receive and hold the cans, the operating mechanism and control features being omitted; Fig. 2 is a view taken through 2—2 of Fig. 1, looking in the direction of the arrows, and particularly shows the location of four sets of piles of cans in the can-holding rack and means for controlling the cans entering the same. I might state here that the machine described in Figs. 1 and 2, shows four stacks of rows of cans, and without departing from my invention the number of four stacks may be decreased or increased by the simple addition or subtraction of the control elements and the extension of the parts involved, without in any way deviating from the spirit of the invention, or the claims hereunto appended.

As I claim the operation of a casing machine of the type herein described by the adaptation of a non-compressible controlling and operating fluid, I am showing, for illustrative purposes, a machine adapted for casing single stacks of rows of cans as a modification without the multiple control shown in Fig. 1, and a modification adapted for casing two stacks of rows of cans, likewise without the selective multiple control. Fig. 3 is a view in elevation of a machine for casing single stacks of rows of cans, and is a modification of the machine shown in Fig. 1, leaving off the mechanism required for stacking plural rows; Fig. 4 is a view in elevation taken on the line 4—4 of Fig. 3, looking in the direction of the arrows; Fig. 5 is a view in elevation of my invention as applied to two stacks of rows of cans in a casing machine, being a view somewhat similar to that shown in Fig. 1; Fig. 6 is a sectional view taken through 6—6 of Fig. 5, looking in the direction of the arrows, and particularly shows the location of the two sets of piles of cans in the can-holding rack in the casing machine, and means for controlling the shelves of said rack.

In order to understand the working of the machine for two stacks of rows of cans, I have shown diagrammatically the various positions of the cans in the casing machine in Figs. 7, 8 and 9, Fig. 7 showing the can-holding rack in position to receive the first stack of rows of cans from the chutes, Fig. 8 being a second position of the machine showing the rack pulled back with its contained stack of rows of cans, and in position for the second stack of rows of cans with relation to the chute, the carton being also shown in position to receive the load; Fig. 9 shows the load ejected into the carton, this latter view showing in dotted lines the position of the case after having been filled and automatically righted and brought into position for removal.

Where a single stack of rows of cans is being cased in the modified form shown in Figs. 3 and 4, for simplicity a mechanically operated can check is found to be more desirable than the hydraulically operated check, the details of which are shown in enlarged views in Figs. 10 and 11, the mechanically operated member 50 being attached to the hydraulically operated can-ejector.

In the plural stacks of rows of cans assembly, it has been found desirable to check the flow of cans into the rack after the stacks have been formed by means shown in Fig. 12; this is operated hydraulically, as hereinafter described.

Referring to Fig. 1, wherein the chutes, the control for the same and the runways are shown, Fig. 13 is an enlarged sectional view of the chute control for distributing the cans in the chute, Fig. 14 being a side view in elevation of the same; Fig. 15 is an enlarged view of the hydraulic operating mechanism for the ejecting appliance and the operation of the can-holding rack when used in the machine casing a plurality of stacks of rows of cans; the same hydraulic mechanism is also used in the single stack of rows of cans; Fig. 16 is the hydraulic apparatus shown in Fig. 15 as applied to a single stack of rows machine; Fig. 17 is a side view in elevation of the mechanism operating the case or carton-holding arm; Fig. 18 is a view in elevation of the machine adapted for a single stack of rows of cans, and is taken at right angle to the view shown in Fig. 3, along the line 18—18 of Fig. 3, looking in the direction of the arrows; Fig. 19 being a plan view of the machine shown in Fig. 18; Fig. 20 is a view of the selective control mechanism for regulating the machine as to the number of stacks of rows of cans to be operated upon, showing one type of control mechanism, Fig. 21 being a view of another type of control mechanism for the same purpose; Fig. 22 is a view in elevation of the power-assembly unit; Fig. 23 is an enlarged view of the type of hydraulic valve with its operating push cam and valve stem; Figs. 24, 25, 26 and 27 are enlarged views of the several cams used respectively for controlling the various movements of the casing machine, Fig. 24 being the cam used for operating and controlling the mechanism for the can check; Fig. 25 shows the cam that operates and controls the mechanism for the retrieving movement of the ejector; Fig. 26 shows the cam that operates and controls the mechanism for the ejecting movement of the ejector; Fig. 27 shows the cam that operates and controls the mechanism for the movement of the case-holding arm. These cams, as shown, are drawn for two-stack rows of cans in a casing machine, shown particularly in Figs. 5 and 6.

Fig. 28 is an enlarged view of the operating cylinder in which works the piston operating the can check, the cam shown in Fig. 24 controls the movement of the piston.

Fig. 29 is an enlarged view of the cylinder in which works the piston operating the ejecting mechanism.

Fig. 30 is an enlarged view of the cylinder in which works the piston operating the case-holding arm.

Figure 3:
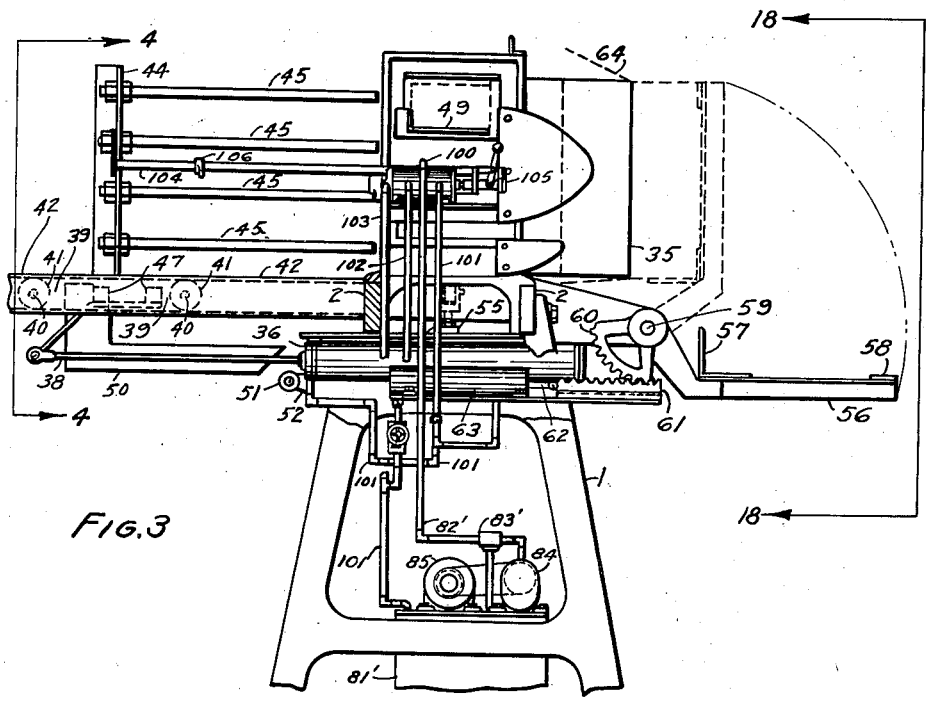

I have shown in large detail the various appliances found desirable in the operation of the casing machine for stacking one row of cans as primarily shown in Figs. 3 and 4 and 18 and 19, Fig. 31 being a view in elevation of the starting valve showing the relative position of the hand-starting lever, Fig. 32 being a sectional view in elevation taken along the line 32—32, of Fig. 31 looking in the direction of the arrows; Fig. 33 is an end view in elevation of the appliance shown in Fig. 32; Fig. 34 is a sectional view of the valve shown in Fig. 32, the valve being in starting position; Fig. 35 is a view similar to that shown in Fig. 34, the valve being in the retrieved or recovered position, and Fig. 36 is a view similar to that shown in Figs. 34 and 35, the valve being shown in neutral position; the operation of which various valves will be described later.

Fig. 37 shows a sectional view of the selective control mechanism shown in Fig. 20, taken along the line 37—37 of said figure, looking in the direction of the arrows; Fig. 38 is an enlarged sectional view taken along the line 38—38 of Fig. 37, looking in the direction of the arrows; Fig. 39 is an end view in elevation of the mechanism shown in Fig. 21, taken along the line 39—39 of Fig. 21, looking in the direction of the arrows. Fig. 40 shows a modified type of piston valve which I have found desirable for use on the valve stems not limited as to rotation.

In the operation of casing machines it is very desirable to have a means for preventing the operation of the machine when loaded with cans, excepting when there is a carton properly positioned to receive the load; in other words, to prevent an inadvertent starting of the machine and dumping the load unconfined. This is accomplished by the mechanism illustrated in Figs. 41-45. This mechanism is not shown in the other views of the assembly, but may be applied to the parts enumerated as indicated in these several views; in fact, it may be applied at any convenient position for operation, as hereinafter explained.

Fig. 41 is a plan view of the device positioned relatively as shown to the carton to be operated upon, the carton flap controlling the mechanism whereby the carton must be introduced into the machine and the carton flap positioned before it is possible to start the machine; Fig. 42 is a view in elevation of the machine shown in Fig. 41; Fig. 43 shows an enlarged sectional view taken along the line 43—43 of Fig. 41, looking in the direction of the arrows; Fig. 44 is a sectional view taken along the line 44—44 of Fig. 41, looking in the direction of the arrows; Fig. 45 is an enlarged sectional view taken along the line 45—45 of Fig. 43, looking in the direction of the arrows.

In a machine involving a plural stack of rows of cans, such as a two-stack row of cans, it is desirable to provide means for preventing a conflict of cans in one stack with those in another stack while being loaded into the rack; this I accomplish by providing a tilting floor under one of said stacks, as shown the first stack formed. Where more than two stacks of rows of cans are being formed, I have discovered that moving the rack slightly in excess is sufficient to prevent conin Figs. 5, 6, 7, 8, 9, 15, 16 and 46, 36 is a double-acting hydraulic cylinder in which operates piston 37 attached to piston-rod 38, which rod is operatively connected to the ejector.

Ejector

The ejector comprises head members 39 (see Figs. 2, 6 and 19) which are spread at their base to form a support, and at each end of the support are provided with shafts 40 upon which are rollers 41. 42 is a channel-iron track in the bosom of which rollers 41 operate. Head members 39 are provided with upright portions 43 to which are secured angle irons 44 (see Fig. 4), which angle irons carry the rams 45, said rams being connected by connecting-ram 46 (see Fig. 46). Head members 39 are connected by suitable braces 47, to which braces piston-rod 38 is operatively attached.

In the description of the machine for two stacks of rows of cans, connecting-ram 46 (see Fig. 46) hooks over shaft 26 on the retrieving movement and pulls the rack away from the funnel as may be desired, according to the controls described later. In the plural machine involving more than two stacks of rows of cans, this same member 46 hooks over the end of the shelves 21 of the rack, the same being provided with a reenforcement member 48 along said edge for said member 46 to hook over (see Fig. 2).

Single stack machine

In the application of my invention to a single stack machine, wherein I employ my hydraulic operating mechanism, I am able to dispense with many of the appliances required in a plural stacking machine.

Figure 10:
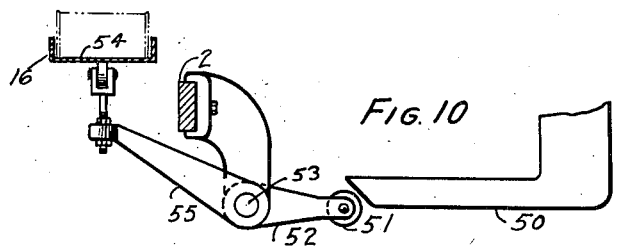
Figure 11:
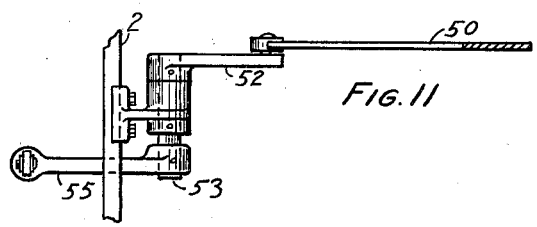
Figure 12:
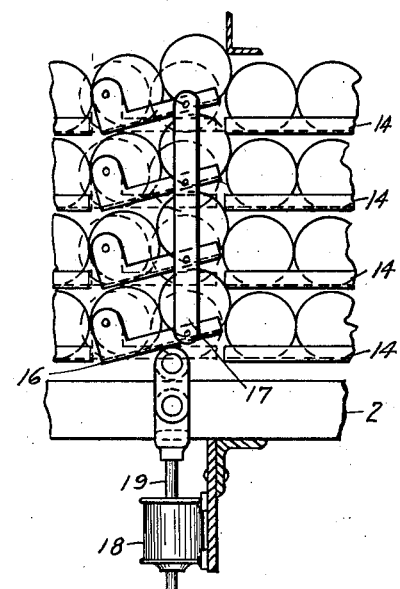
Figure 14:
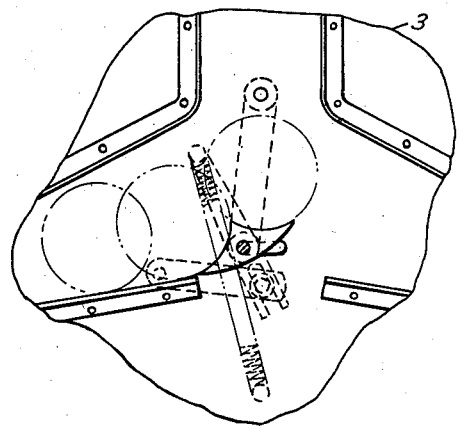
Figure 13:
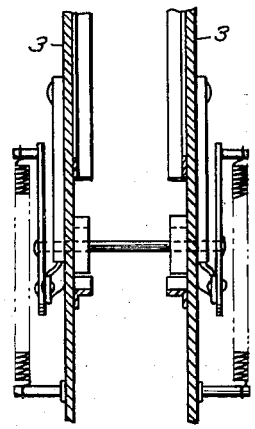
Figure 15:
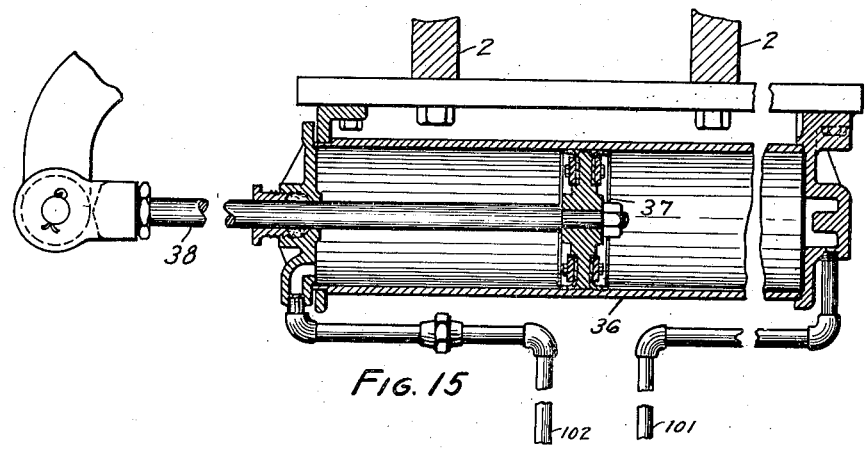
Figure 16:
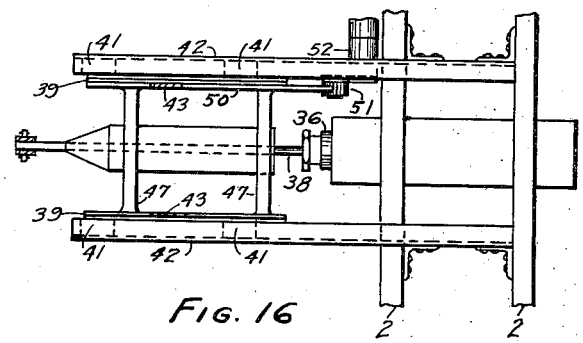
Figure 17:
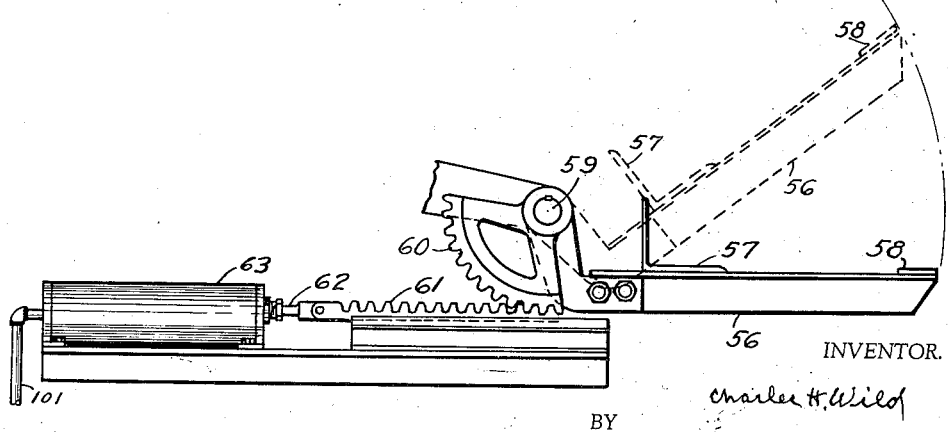
Figure 18:
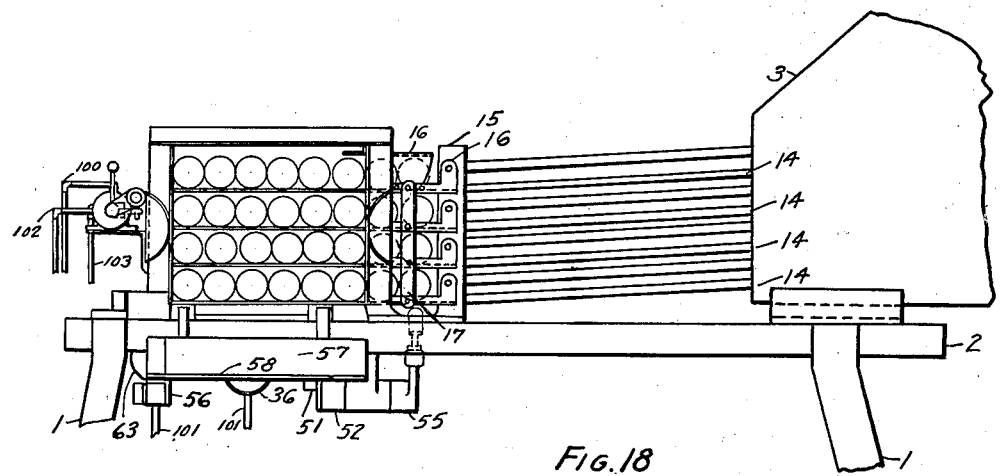
Figure 19:
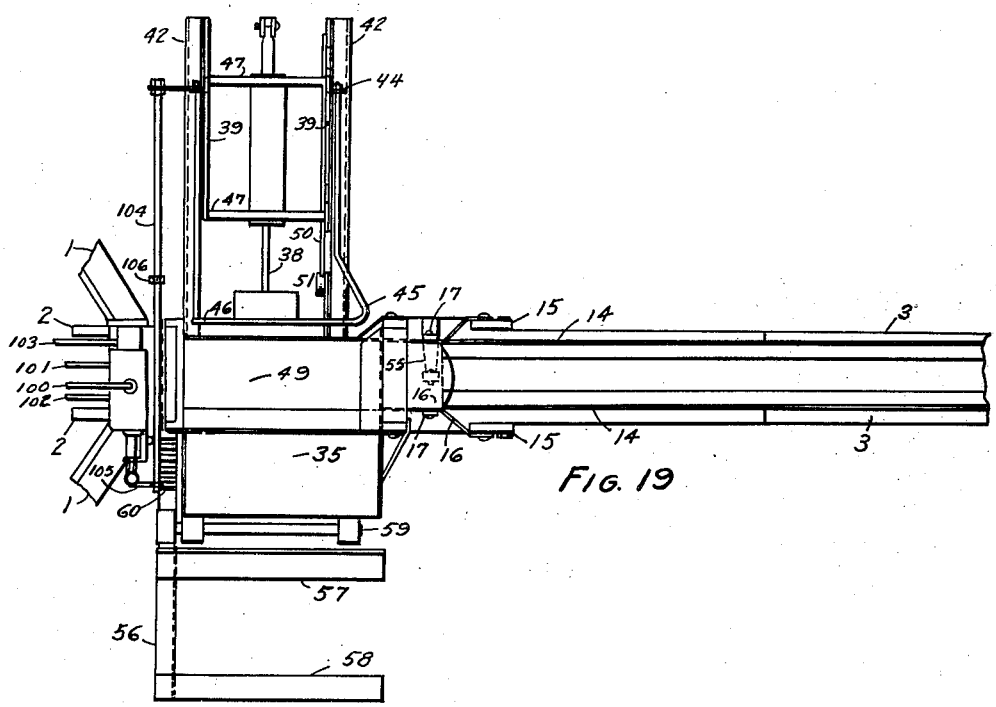

Referring particularly to Figs. 3, 4, 18 and 19, an immovable rack 49 is provided, comprising what we might call a continuation of the chutes for forming the rows in a plural stacking machine provided with a can-stop mechanically operated, and which consists of a similar construction as heretofore described so far as the chute is concerned, but instead of being operated by an individual hydraulically operated piston, the operation is performed by the movement of the ejector mechanism, which is hydraulically operated. 50 is a cam secured to head-member 39 and shown in Fig. 3, and in enlarged views in Figs. 10 and 11. Cam member 50, by means of the roller 51, operates lever 52, which lever is secured to shaft 53 operating in a bearing secured to the frame of the machine. On shaft 53 is lever 55, which lever operates the can-stop. 54 is the floor of the can stop, and is somewhat similar to can-stop 16.

Plural stacks of rows of cans—more than two

In Figs. 1, 2, 5, 6, 7, 8, 9, 12, 24 and 28, the chute and delivery of the cans, together with the can stop, is operated similarly to the operation heretofore described for the machine forming two stacks of rows of cans.

The shelves of the rack, where more than two stacks of rows of cans is involved, are made continuous and are not provided with openings for platform 24, the same being dispensed with; and to insure the non-interference of entering cans in the various stacks, a wider range of movement of the rack is provided, which will be described later. The rack, its mountings, construction and assembly are substantially the same as heretofore described, except where attention was called to variations required for double and plural stacking; and similar numerals are provided in these figures for similar parts irrespective of two or more stacks of rows of cans. The difference has heretofore been pointed out concerning the stops for pulling the rack, and other details; description of the timing will be given later.

Case or carton-holding arm

Referring to Figs. 3, 7, 8, 9 and 17, 56 is the arm to which is secured angle-iron 57 and member 58; these latter two members, 57 and 58, form the support for the bottom of the container and carry the same when discharged from the funnel. Arm 56 is fulcrumed on shaft 59, which shaft is journalled in mountings attached to the frame of the machine in proper position for arm 56 to operate for holding the containers in proper position with reference to the machine. On shaft 59 is secured quadrant-gear 60 operated by rack 61, which rack is operated by piston-rod 62 operated by a piston in hydraulic cylinder 63. This is a single-acting cylinder and piston, operating to lift the arm into holding position for holding the carton onto the funnel for loading purposes. The release from this cylinder controls the speed of descent or the assuming of normal position, and the speed at which the same can be manipulated depends upon the character of the load in the carton. The needle valve controlling this motion will be described later.

Safety device

It has been found desirable to attach a safety-device to the casing machines to prevent premature discharge of stacks of rows of cans prior to the proper placement of a container for the same. As showing a means for overcoming this, I would refer particularly to Figs. 41-45. 64 is the container, and 65 the flap thereof. Near the rear end of the funnel 35 is flap-guide 66 for opening the flap to a predetermined position. This flap guide 66 has an opening 67 through which trigger member 68 may pass when there is no carton flap to intervene.

69 is the starting handle operating the bell-crank 70. 71 and 68 form a toggle-link or lever, toggle-member 71 being pivoted to bell-crank 70 at one end and to link 72 at the other end. Trigger-member 68 is connected by a bearing with toggle member 71 and link 72, spring 73 tending to keep trigger-member 68 and toggle-member 71 in extended position against the limiting stops 74.

75 is the valve stem controlling the starting valve for the machine. 76 is the operating lever, at one end of which operates valve stem 75 and the other end of which is operated by link 72. 77 is a spring tending to keep lever 72 in such a position that operating lever 76 is free from valve stem 75, that is, in open position. On the contact end of trigger 68 is a curved contact member 79 to prevent scarring the carton flap; 80 is an additional flap guide to insure the flap lying flat against guide 66. The mechanism above described is mounted in any convenient way adjacent the flap receiving members described, so that the trigger-member 68 in contacting with the interposed flap will cause link 72 to operate levers 76 to operate valve stem 75, thereby starting the machine. In the event that no flap is in position, link 72 will idle, trigger-member 68 going through the hole in the guide.

The apparatus described in Figs. 41-45 is for the apparatus used on a machine for stacktact, thus avoiding the mechanism shown in Fig. 46. In the can stop illustrated in Fig. 3 for the single stack of rows of cans machine, I have shown an enlarged view for the same in Fig. 47.

The invention involving the hydraulically operated mechanism described is new in casing machines, and I claim the various appliances for operating and controlling the hydraulic movements of the same. With that in view, instead of the mechanism shown above, I may use solenoidal valves, and by means of the electric current operating over selective switches I am enabled to control the various valves to operate my machine. Fig. 48 shows a shaft provided with selective switches and contacts for operating the various valves, as a type of the above suggestion, but I do not wish to limit myself to a rotary contact control; and this shaft may be shifted endwise or otherwise displaced to accommodate the timing required for machines stacking various stacks of rows of cans, as a selective means for changing the machine as to the number of stacks of rows of cans to be operated upon. Fig. 49 is an enlarged view of a rotating snap electric switch whereby a movement in one direction closes the switch, and another movement in the same direction opens the switch, and so on.

Similar numerals refer to similar parts throughout the several views.

1 are the legs which support rails 2 on each side of the machine. 3 are side plates between which are the chute and can distributing mechanism. 4 is the initial can chute receiving the cans from the supply. 5 and 6 are chutes receiving cans from the initial can chute, distributed by distributor or vane-divider 7. Chute 5, by means of vane-divider 8, distributes into chutes 9 and 10. Distributor or vane-divider 11 distributes the cans from chute 6 into chutes 12 and 13; whereby the cans entering initial chute 4 are distributed into delivery chutes 9, 10, 12 and 13 for a 4-row stack. More rows may be provided as desired by means of additional chutes and means for distribution. I do not wish to limit myself to any number of chutes or means of distribution.

The chutes are ordinarily made by means of two-facing angle irons between which the cans roll; in the drawings these angle irons are designated as 14, one on each side.

15 is a side support to which the angle irons 14 are secured, and to which the can-stop 16 is fulcrumed, (see Fig. 19) can-stop 16 being formed to fulcrum on each side of side support 15 and having a central portion or floor which may intercept the cans rolling over the same when said stop is elevated, and a top member under which the cans roll, preventing the cans from jumping out, or rolling on top of each other.

Can stops

Can stops 16 are provided at the delivery end of each of the chutes leading into the casing machine to stop the rows of cans when the row in the machine is filled, and to hold the cans during the process of ejectment and other timed movements of the machine (see Fig. 5).

These can stops in front of each chute are simultaneously operated by means of connecting link 17. 18 is the hydraulic cylinder operating plunger 19 for raising the can-stops, said plunger as shown simply bearing against the underside of the lower can stop by means of mechanism (see Figs. 2, 5, 6 and 12), depending upon gravity or additional spring pressure to replace the can-stop upon the retrieving of said plunger.

Rack

Particularly referring to Figs. 1, 2, 5, 6 and 46, 20 is a side rack plate to which are secured shelves 21 in any suitable manner, such as by flanging or angle irons, the other side of said shelves 21 being supported by upright support 22, at one corner, and the other corner of the shelves being supported by bearing member 23. Shelves 21 are provided with an opening into which fit platforms 24 (see Fig. 46), shelves 21 and platforms 24 forming the floor upon which the cans rest. Bearing member 23 has bearings 25, in which two bearings, shafts 26 operate. Platforms 24 are secured to shafts 26 whereby the platforms may be tilted out of alignment with shelves 21, carrying therewith the cans loaded thereon. On the end of shafts 26 are levers 27.

In the drawings above referred to, provision is made for stacking two stacks of rows of cans, and the description to follow concerning the movable platform is particularly adapted for such a machine. I do not wish to limit myself, however, to a 2-stack machine, as floors may be provided in a machine for any number of stacks, if desired.

28 is a link connecting levers 27. Shafts 26 may have levers on both ends, or singly, as found convenient in construction.

It might be well to explain here why this tilting platform may be desirable in certain cases. Where high speed is required in the operation of a rack containing a stack of rows of cans, as one stack is piled it is desirable to prevent the succeeding stack from becoming entangled with the preceding one; this is prevented by raising the platform 24 which forms a guide for the oncoming new stack of cans. Otherwise it is found desirable to extend the rack and allow more clearance between the stacks.

On the end of one of the levers 27 is an extension 29 to which is provided a roller 30. 31 is a cam rail relatively fixed to the machine and over which roller 30 travels and is controlled thereby, the cam portion being properly positioned for the roller to operate the platforms after having been loaded with cans prior to the loading of the adjacent space. In Fig. 46 the platform 24 is in what is called open position, that is, not coincident with the shelf 21; it is in the position that it assumes after having been loaded. 32 is a spring for insuring contact of roller 30 with cam-rail 31, said spring being secured at the outer end to one of the levers 27, or to link 28, the other end being relatively fixed. The rack assembly containing the floors 21, upright 22, bearing member 23 and other attached members, is supported by roller 33 on what I might call the outer end, that is, the end farthest from the chute, which will be described later. Roller 33 operates on fixed rail 34, which rail may be of channel-iron of any convenient cross-section, the rack assembly being supported by two rollers 33, at one end, and at the other end sliding into funnel 35. Chute 35 is what we might call the funnel over which the container to be loaded with cans is placed.

Loading and ejecting mechanism

Still confining myself to the machine for stacking two stacks of rows of cans, particularly shown ing single rows of stacks of cans, particularly as shown in Figs. 3, 4, 18 and 19, wherein hydraulically operated machinery is involved for certain movements only. In the machine for stacking two or more stacks of rows of cans, instead of valve stem 75 a similar member, 75$^1$, is used as operating an electric switch; otherwise, these various parts as described operate similarly in all classes of machines.

Referring to Figs. 49, 41–45, 32–36, it will be noticed that I have numbered as prime numbers elements 75$^1$, performing a similar function to 75, and 104$^1$, performing a similar function to 104; these two members operating the rotary snap switch 137. Fig. 49 is an enlarged view of the operating mechanism for the rotary electric switch, 137 being the rotary switch shaft of the ordinary type, which makes a one-half revolution when slightly displaced, either opening or closing the switch. I do not wish to limit myself to any type of switch, as there are many types suitable for this purpose. On rotary switch shaft 137 is secured ratchet-wheel 138, which wheel is operated by ratchet 139 resiliently secured by means of fulcrum 140, guide 141 and spring 142 to member 75$^1$. 143 is a rack resiliently secured to member 104$^1$ by fulcrum 105$^1$ (see, in this connection, Figs. 19 and 49), guide 144 and spring 145.

It will be noticed that as 75$^1$ operates in the direction of the arrows it will turn switch shaft 137 and close the circuit operating motor 95, and the ejecting mechanism by means of rod 104$^1$ will further operate switch shaft 137 when contacting therewith through rack 143, thereby opening the circuit.

Controls

I have discovered that for the purpose of accuracy, convenience in operation and setting, and the general working of a machine of this character, it is desirable to have the various timing elements concentrated at a central station, and controlled as far as possible by a single member. With that end in view, a hydraulically operated mechanism lends itself ideally to this situation. I have brought the valves controlling the various hydraulic systems operating the various timed elements to a single station, and have operated them automatically by a single timing member properly constructed to time the various valves, as may be desired. In the operation on plural stacks of rows of cans of any desired number, I am enabled to change my central controlling elements at will. I will now describe my controlling elements.

In the machine for stacking single stacks of rows of cans, I have shown two hydraulically operated devices, one for operating the case or carton-holding arm, and the other for operating the ejector; appliances attached to one or the other of these devices controlling the can-stop in timed relation.

In the machine for stacking plural stacks of rows of cans, I have shown three hydraulically operated mechanisms, one, as mentioned above, for operating the case or carton-holding arm, another for operating the ejector, and a third for operating the can-stop. These various hydraulically operated mechanisms are controlled by valves admitting and discharging fluid to each of the same at desired intervals, in timed relation. I have found it convenient to operate all my hydraulic cylinders under a uniform pressure, which pressure may be obtained by any well-known means. In Fig. 22, I have shown an electrically driven pump 84, drawing a fluid such as glycerine, or any other suitable fluid, from a reservoir 81, and discharging into discharge pipe 82, tending to maintain a constant pressure in discharge pipe 82 and the discharges therefrom. 83 is the relief valve against which the pump 84 is pumping, and which relieves the pressure when in excess of that desired in pipe 82, relief valve 83 discharging into reservoir 81. It will be seen that pump 84 may be continuously operated, and that no damage will be done, as the relief valve 83 will take care of the excessive pressure and return the fluid.

Pump 84 is driven by electric motor 85, and during the operation of the machine is continuously running, thus forming a uniform fluid pressure for the operating fluid. In the single stacking machine shown in Fig. 3, a somewhat similar, though less elaborate, pumping system is shown, but working substantially on the same principle. 82$^1$ is the discharge pipe, 83$^1$ the relief valve, 84$^1$ is the pump, 85$^1$ is the electric motor, and 81$^1$ is the reservoir.

Referring to Fig. 22, 86 is the pressure valve chamber into which the discharge from discharge pipe 82 occurs and 87 the discharge pressure valve chamber, said chamber being in direct connection with the reservoir through pipe 88.

Valves

Pressure chamber 86 communicates with valves controlling the various hydraulically operated mechanisms, an enlarged view of the valves used in this chamber being shown in Fig. 23, in which 89 is the operating cam operating valve-stem 91 by means of roller 90, mounted thereon, against the pressure of spring 92. Valve stem 91 operates valve 93; in the case shown, it is integral with the same. I would call attention at this point to Fig. 40, which shows a piston type of valve that I have found to be equally efficient, and which I have shown as 93$^1$ operated by valve stem 91$^1$ and spring 92$^1$.

Fig. 23 is substantially a view in section, taken through 23—23 of Fig. 22, looking in the direction of the arrows. There are a number of these valves formed into pressure valve chamber 86 and operated by cams on cam-shaft 94, which shaft is driven by electric motor 95 timed at greatly reduced speed. This shaft so driven, controls the operation of the entire machine, and the shaft is timed to suit operating conditions. Of course, electric motor 85 must be driven at sufficient speed to supply the pressure required by the movements of the machine as determined by electric motor 95. Electric motor 95 is started and stopped by breaking the circuit thereto by any ordinary means, such as a hand-controlled switch and an automatic means provided for breaking the circuit at the end of the cycle of operation. In Fig. 49 I have shown such an automatic means as applied to the electric operating mechanism for opening the circuit, and in the same figure I have shown means for closing the circuit by means of the safety device set forth in Figs. 41–44. For a better understanding of the cycle of operation, I would refer to Fig. 8 as the initial position of the rack in normal stopped position after having been loaded with cans ready for ejecting into a carton, the carton being shown in position over the funnel for receiving the cans, and at this instant the machine is stopped, so far as the loading process is concerned. To start the machine, referring to Fig. 49, the circuit is closed by means of the safety device operating the switch as there shown. This circuit controls motor 95, which motor drives the timing mechanism either for the hydraulic or the electric control. This motor will continue to run until the switch controlling its current is opened. This is accomplished by means of the ejector carriage after having ejected the load into the carton, as shown in Fig. 9, and after partial retrieving, as shown in Fig. 7, and fully retrieving, as shown in Fig. 8. Ordinarily, the motor is started by the operator after the insertion of a case over the funnel, the switch being placed conveniently for such hand operation. The mechanism shown in Figs. 41–45 is adapted as a safety switch for controlling this motor and operates a switch in place of valve stem 75 (see Figs. 44 and 49).

Cam shaft 94, with its assembled cams thereon, is constructed to time the movements of the machine for the number of stacks of rows of cans desired. If a different number of stacks of rows of cans is desired to be placed in the machine, a different cam shaft with different cams thereon is employed, as shown in Fig. 20, the different cam-shafts thereon being numbered $94^1$; or a single shaft with a plurality of cams thereon for the different number of stacks of rows of cans, which may be shifted endwise to accommodate the cans to the respective valves, may be employed, as shown in Fig. 21. An electric switch may be used, particularly as illustrated in Fig. 48, which would operate similarly; that is, move endwise to accommodate the different adjustments of the machine regarding the number of stacks to be piled.

Referring again to Fig. 23, or, as suggested above, the piston type of valve, shown in Fig. 40, these valves have pressure admission and discharge outlets, depending upon the position of the valves, all of the valves being substantially alike; in the case of the double-acting cylinder, the independent valves are used for each end of the cylinder and controlled by the cams on shafts 94 and $94^1$. For illustrative purposes, I have shown in Figs. 24–27 the design for cams to be placed on cam-shaft 94 for operating the valves on a machine for two stacks of rows of cans; Fig. 24 showing the cam for operating the can-stop; Figs. 25 and 26 showing the two cams operating the two valves, one at each end of the double-acting cylinder for controlling the ejector, and also the retrieving motion of the ejector, carrying the rack with it at one step; Fig. 27 shows a cam controlling the case-holding arm mechanism; as shown in the several figures, they are in timed relation with each other for performing the functions required. This, however, is simply a detail of drafting, and I claim nothing concerning the construction of these cams.

In case three stacks, or four stacks, of rows of cans are to be piled in the machine, the cams would be designed accordingly for the various movements required; that is, for a 3-stack machine the forming of one stack and a movement of the rack; the forming of another stack and movement of the rack; and the forming of another stack, and then the ejecting of all three stacks from the rack, and the return of the rack to initial position.

For illustrative purposes, with reference to the cams shown in Figs. 24–27, I have shown the ejector hydraulic cylinder in view 29 with the several positions of the operating piston rod thereof, the position at "A" being the initial position of the rack for receiving the first stack of rows of cans; the position at "C" being a retrieved position of the rack after one stack of rows of cans has been inserted within the same and it is in position to receive the second stack of rows of cans. The ejector then moves to position "B", ejecting the cans from the rack and then returns the rack back to the initial position, the ejector then stopping at position "A" as a cycle. Similarly, concerning the piston controlling the can-stop, it is in initial position at "E" permitting cans to pass through the chute, and is put into operative position at "D" to stop the cans, which position corresponds to the position of the cans in Fig. 24. Likewise, the piston for the case-holding arm, shown in Fig. 30, is in initial position at "F", corresponding to the cam position shown in Fig. 27, and is in operative position when holding the carton in the machine at "G".

The cam shown in Fig. 26 is attached to the power end on the retrieving stroke of the cylinder shown in Fig. 29, and it will be noticed that at one portion it controls the valve into neutral or closed position as regards supply and exhaust, where the cam in Fig. 25, being at the other end of said cylinder, permits exhaust at all times excepting when admission occurs. Attention is called to the valves shown in Figs. 32–36, where exhaust occurs, as heretofore described, from 103 and is by-passed through the casting of said valve from either end, as shown in Fig. 31 by dotted lines, as may be desired.

Referring to Fig. 22, pipe 96 is connected with the control valve within chamber 86 similar to the other valves located therein, and supplies fluid under pressure to hydraulic cylinder 63 at the power end thereof through check valve 97. It will be noticed that by the introduction of check-valve 97 the discharge port of this valve is inoperative, when open as fluid cannot return through pipe 96 against check-valve 97. To overcome this I provide by-pass pipe 98 in which is control valve 99. By this means the regulation of control valve 99 determines the speed with which fluid may return through the discharge port of the valve, permitting the case-holding arm to descend at any speed desired.

Figures 4, 47:
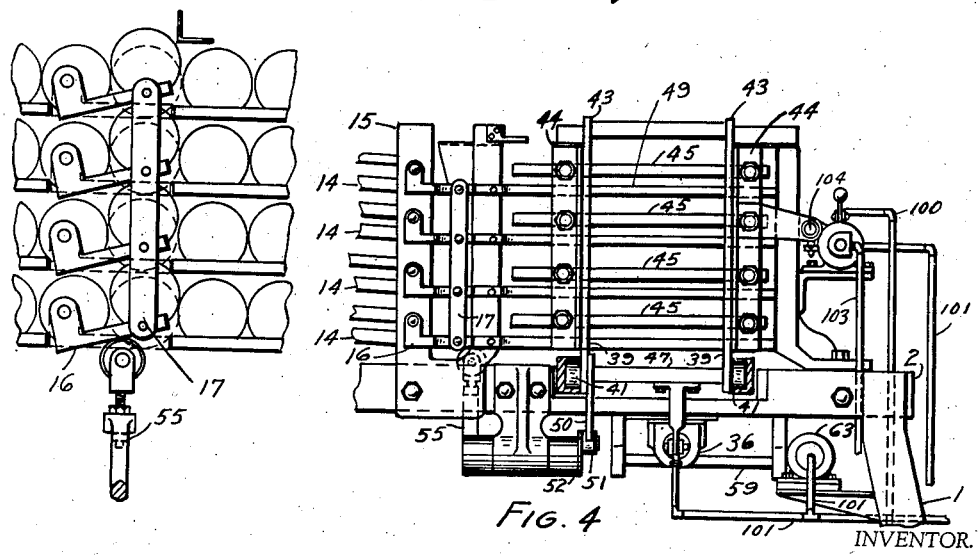

Referring to Figs. 3 and 4, and 31–36, which illustrate various positions of the control valves for the machine stacking single stacks of rows of cans, in Fig. 4, 36 is a double-acting hydraulic cylinder, and 63 is the hydraulic cylinder operating the case-holding arm, as heretofore described.

The valve shown in Figs. 31–36 is provided with an inlet port 100, two operating ports, 101 and 102, and an exhaust port, 103. Operating port 101, with the piston valve shown in Fig. 34, connects the carton-holding hydraulic cylinder and is under pressure, the arm being in holding position, holding the carton against the funnel. This same port 101 is connected with the double-acting hydraulic cylinder operating the ejector, and is on the ejecting end of the cylinder 101, forcing the rams 45 out, or loading the cans into the carton. I have used the same numerals for the valves and for the pipes connected with the valve ports, to avoid confusion. The double-end cylinders, the other end from pipe 101, that is, pipe 102, connects with valve port 102 and the exhaust is controlled thereby; but no connection is made with this port to the cylinder operating the holding-arm. I might state here that the position of the machine as indicated by the setting of the valve in Fig. 34 is the initial or starting position. When the machine is in the position caused by the position of the valve shown in Fig. 35, it is at the end of the ejectment and ready to be retrieved, the carton being on the arm moving downward, according to the adjustment of controlling valve 99.

Referring to Fig. 34, 104 is the arm or rod travelling with the ejector and attached to and parallel therewith; this may be seen also in Figs. 3, 4, 35, 36 and 41. This rod is provided with stops 105 and 106 and dog-latch 107, which latter latch is a bell-crank and acts as a detent against valve 75 at shoulder 108, holding the valve in the position shown in the Fig. 34 until released. This valve has a spring 109 tending to keep the same engaged with said valve stem. 110 is a detent or ball-latch for holding the valve in neutral position when placed there; this valve operates in groove 111 and is engaged in said groove, as shown in Fig. 36.

Starting with the valve in the position shown in Fig. 36, which is the neutral position and the machine inoperative, by means of hand lever 112 fulcrumed to a relatively stationary member at 113 through link 114, valve stem 75 is shoved into the position shown in Fig. 34. This renders the machine operative and moving, the ejector ejecting the cans and the holding arm under pressure holding the carton, the rod 104 moving in the direction of the arrow shown in Fig. 34, the valve stem 75 being held in operative position by dog-latch 107. When the ejector reaches the end of its stroke, rod 104, carrying stop 106, has also reached the end of its stroke, and stop 106 contacts with dog-latch 107, releasing valve stem 75 which by means of spring 115 is forced outward to the outer limit of movement thereof, the position shown in Fig. 35. At this point, a reverse movement of the ejector occurs and a release of the fluid in the cylinder operating the case-holding arm is had, and rod 104 moves in the direction of the arrow until stop 105 contacts with the end of the valve stem 75, pushing it into neutral position, when all movement stops and the machine is again in position for starting. In this latter position the valve stem is held by means of securing ball detent 110 in groove 111.

Repeating, I would call attention to the fact that the position of the valves shown in Figs. 32–36 is for a one-stack row of cans machine, and the safety device shown in Figs. 43–45 is omitted, the machine being started by handle 112. The automatic device shown in Figs. 43–45 may be supplied in place of handle 112, as shown in Fig. 44.

*Control mechanism*

The various valves controlling the flow of the fluid into the various hydraulic cylinders are controlled from a central point. In this connection, I would call attention to Figs. 20, 21, 37–40. Shaft 94, carrying the operating cams 89, is driven by a gear 116 (see Figs. 20, 37 and 38). 117 is the selective supporting shaft journalled at each end in any convenient position to accommodate the valves which are controlled by cams 89, one end of said shaft having an index handle on a dial plate for selective adjustment. This shaft has secured thereto spider 118, said spider carrying the shafts 94 upon which cams 89 are mounted. A shaft with its proper designed cams thereon is provided for operating the machine for the desired number of stacks of rows of cans, we will say for one. If two stacks of rows of cans are desired, another shaft, 94, is provided with another set of cams for operating the machine for two stacks of rows of cans; that is, there is inserted means for operating the rack backward and forward in timed relation with the ejecting mechanism, as may be desired for stacking purposes, as heretofore explained. If three rows of stacks of cans be desired, another shaft 94 is provided with correspondingly designed cams for controlling the machine for stacking the cans, and so on. These various shafts 94 are mounted in spider 118 at one end, and at the other end by member 122 secured to shaft 117, which member 122 acts as a bearing for shaft 94, as many as may be required for the machine to stack the desired number of stacks of rows of cans; as shown, four. These shafts are driven by means of gear 116 by a planetary gear 119, the same being an internal and an external gear, and is driven by any suitable means, such as gear belt 120 driven by reduction gear 121. This reduction gear is driven by an electric motor, such as 95, and similarly controlled.

Referring to Fig. 38, planetary gear 119 is secured to a supporting member 123 which rotates around members 122 and 118. Any means, however, which may be found desirable may be employed for operating these gears, the same being simply a question of mechanics.

From the above it will be noticed that shafts 94 are continuously operating when motor 95 is running, but only one is in line with the valve stems and the cams of which are operating said valve stems at any one interval.

Instead of the mechanism shown in Figs. 20, 37 and 38, a single shaft may be used, as shown in Figs. 21 and 39, and the various cams secured thereto and selectively brought into position by sliding shaft 94 endwise. To do this, however, as designed it is necessary to lower the shaft away from the valve stems before shifting. This is shown in Fig. 39. The driving of the shaft is similar to that shown for the previously mentioned shafts, driven by gearing from an electric motor.

Referring particularly to Fig. 48, which shows a modification of the electrically controlled hydraulic valves, 124 is a circular switch drum, or rather a combination of switches, each circular switch, 125, 126, 127 and 128, represents the circular switches respectively for controlling a single, double, three and four stacking of rows of cans, as may be desired, depending upon which row is under the brush. The foregoing refers to one valve control, as the drawings show valve controls for the ejecting mechanism, the can-retrieving mechanism, the can-stop mechanism and also the case-supporting mechanism, each of which has its respective selective circular switches for the number of stacks of cans desired. These various circular switches are independent of each other and have one connection to the interior brush contacting element 129 and operate under brushes 130. The circular switch under brush 130 determines the timing of the machine desired for the predetermined number of stacks of cans to be cased, and the switch is designed accordingly. As shown, the solenoidal valve 131 is for the can-stop, 132 is for the solenoidal valve for the ejecting and retrieving mechanism, which valve is double-acting and is controlled by two of the circular switches, and 133 is a solenoidal valve controlling the case-holding arm mechanism.

Referring to Fig. 48, it will be noticed that the shaft which I have designated as 94¹, and which performs the same function as the shaft heretofore used for the cams, is similarly driven and may be shifted endwise without taking it out of its bearings and locked in desired position by locking finger 134, which operates in grooves 135. Grooves 135 correspond to the desired position of the circular switches 124—128. 136 is an indicator operating in conjunction with indicating markers on shaft 94¹ to show which of the circular switches is in contact with its respective brush; that is, to show how the machine is set with reference to the number of stacks of rows of cans to be operated upon.

Shaft 94¹, as heretofore described, is operated by electric motor 95, and is stopped and started by means shown in Fig. 49. The machine in its operation is substantially the same, whether controlled by the electric mechanism shown in Fig. 48 or the cam-mechanism shown in Figs. 20, 21 and 22.

The operation of my invention is substantially as follows:

*Summary of operation*

The starting position ("A") of the machine is shown in Fig. 7. The cans enter the runway (Fig. 1) and are divided alternately into channels 5 and 6, and then alternately into 9 and 10 and 12 and 13, all entering the superimposed runways 14 and then run onto movable rack as shown in Fig. 7. The operator then places a case over chute 35, as shown in Fig. 8. He then moves lever 69 (see Fig. 41), and this starts the operation of the valves and case-holder 56 raises into position, as shown in Fig. 9. The can stops 16 raises sufficiently to hold back the cans in chute 14, and then the ejector 44 moves to "C" position drawing the rack with it in its rearward motion (see Fig. 8). The can-stop then lowers to normal position, allowing another superimposed row of cans to roll down onto the rack. The can stop 16 then raises again to hold the cans back in 14, and then the ejector moves to "B" position, as shown in Fig. 9, pushing all the cans into the case and case-holder 56 lowers to the dotted position, as shown in Fig. 9. The ejector then returns, moving sliding rack to "A" position (see Fig. 7), and then can stop 16 drops to normal position, allowing the cans to run into the rack, which completes the cycle of operation.

The speed of the return of the case-holder is governed by valve 99 which controls the fluid returning in pipe 98 (see Fig. 22).

When it is desired to use the hand-safety starting device, the same is thrown (see Figs. 41–45), and if no carton is in position the machine does not start. If a carton-flap is in position the link 72 (see Figs. 41–44) is operated, whereby valve stem 75, in the case of a single stack of rows of cans machine, is operated. In other cases, a switch is operated as shown in Fig. 49, whereby motor 95 is energized and automatically stopped in timed position. The cans being fed through the respective chutes fill the rack with the number of stacks of cans for which the machine is set, and it remains in that position (stopped) after having been filled until started by hand with a carton in position, whereupon the carton-holding arm immediately contacts with the carton bottom, and the ejector proceeds to eject cans into the container and pushes the carton from the funnel upon which it has been placed by hand. The loaded carton is gradually removed into an upright position on the carton-support for removal by hand, or otherwise. During this interval the ejecting device retrieves to the position heretofore described for the stacking of the first row of cans, and then automatically moves the rack into position for receiving the additional row of cans if the machine is set to receive the same, and so on, until the rack is loaded and the machine stops, ready for initial starting again.

In this specification, and claims, when I use the term "hydraulic", or "hydraulically", I mean the employment of a substantially incompressible fluid in contradistinction to an elastic fluid, such as air. I have found that more definite and accurate operation of the machine is obtained by means of an incompressible fluid. When I use herein the term "case", or "carton", or "container", I mean the element into which the cans are loaded.

Having thus described my invention, what I claim and desire to secure by Letters Patent is:

1. In a casing machine provided with a can-holding rack adapted to receive and hold a plurality of cans for ejecting into a case, an ejector mounted for reciprocal movement in the rack for ejecting the cans therefrom into a case, means arranged and adapted to control the movement of the ejector and the rack for giving said ejector and said rack a relative movement whereby a row of cans in said rack is moved with the rack upon a return movement and ejected from said rack by the forward movement of said ejector.

2. In a machine of the character described, a movable holding rack adapted to receive and hold a plurality of stacks of rows of cans, means for moving said rack horizontally, away from a container to be filled to accommodate the successive forming of stacks of rows of cans therein from chutes, forming a single stack of rows at a time and means for ejecting said stacks of rows of cans so formed from said can-holding rack into containers.

3. In a machine of the character described, a movable holding rack adapted to receive and hold a plurality of stacks of rows of cans, means for moving horizontally said rack to form said plurality of stacks of rows of cans therein, means for ejecting said stacks of rows of cans so formed from said can-holding rack into containers, and a selective unit control element selectively mounted to control the various movements of the holding rack and the ejecting means controlling the loading and ejectment of said cans into and from said rack.

4. In a machine of the character described provided with a can-holding rack adapted to receive and hold a plurality of cans for ejecting into a case, means for moving said rack horizontally with reference to filling chutes discharging cans therein whereby a plurality of stacks of rows of cans may be formed in said rack, and means for ejecting said stacks of rows of cans from said rack into a container, or case.

5. In a machine of the character described provided with a can-holding rack adapted to receive and hold a plurality of cans for ejecting into a case, a hydraulically actuated ejector mounted for reciprocal movement in the rack for ejecting the cans therefrom, means for moving said rack with relation to a chute discharging cans therein whereby plural stacks of rows of cans may be discharged into said rack, comprising a mechanism actuated by said ejector, means arranged and adapted to control the movement of the ejector and the rack whereby short strokes of the rack are provided for loading purposes and a relatively long stroke of the ejector is provided for discharging the cans out of said rack into a case.

6. In a machine of the class described, a can-holding means for holding cans in a plurality of rows arranged one above the other therein, means for stacking said cans in said holding means, means for shifting said holding means containing a stack of rows of cans in the direction of the axes of ejecting means whereby upon the movement of said holding means another stack of rows of cans may be formed therein, and means for ejecting said stacks of rows of cans so formed from said holding means into a container operating in parallel alignment with the operation of said holding means.

7. In a machine of the character described, a movable can-holding rack adapted to receive and hold stacks of rows of cans, selective means for forming said stacks of cans consisting of hydraulically operated mechanism for the movement of said rack and the movement of an ejecting mechanism and a selective means of control for said hydraulically operated mechanism, means for checking the hydraulically operated mechanism in timed relation at different positions for locking said rack while being so filled and means for ejecting said stacks of cans so formed from said can-holding rack into containers.

8. In a machine of the class described, means for stacking cans in a plurality of rows arranged one above the other, means for shifting said cans in the direction of their axes away from a container to be filled and subsequently shifting said group of cans into said container.

9. In a machine of the class described, means for stacking cans in a plurality of rows arranged one above the other, means for shifting said cans in the direction of their axes away from a container to be filled, said stacking means being operable to form a second group of cans in line with the said shifted group of cans, and means for shifting said groups of cans into said container.

10. In a machine of the class described, means for stacking cans in a plurality of rows arranged one above the other, means for shifting said cans in the direction of their axes away from a container to be filled, an operating mechanism adapted to be released for a single cycle of operation and connections from said mechanism for operating said shifting means near the end of one cycle of operation to shift a group of cans away from said container, and for operating said shifting means during the next cycle of operation to shift said group of cans from said moved position into said container.

11. In a machine of the class described, means for stacking cans in a plurality of rows arranged one above the other, means for shifting said cans in the direction of their axes away from a container to be filled, an operating mechanism adapted to be released for a single cycle of operation, and connections from said mechanism for operating said shifting means near the end of one cycle of operation to shift a group of cans away from said container, and for operating said shifting means during the next cycle of operation to shift said group of cans from said moved position into said container, said stacking means being operable to form a second group of cans in line with the moved group of cans between the operations of said shifting means, whereby two groups of cans will be simultaneously shifted into a container.

12. A machine of the character described comprising, a hydraulically movable can-holding rack adapted to receive and hold stacks of rows of cans, selective means for forming said stacks of rows of cans and means for ejecting said stacks of rows of cans so formed from said can-holding rack into containers, said means for forming and ejecting being controlled by a unit structure operated in relative timed relation.

13. In a machine of the character described provided with a holding rack adapted to receive and hold a plurality of rows of cans for ejecting into a container, means for moving said rack with reference to a filling chute adjacent thereto whereby a plurality of stacks of rows of cans may be formed in said rack, said rack being provided with a shelf for holding a row of cans and a platform in alignment therewith for holding a row of cans, means for elevating one end of said platform out of alignment with said shelf to provide a guide for a row of cans being deposited on said shelf, means for ejecting said cans from said rack into a container, and means for timing the respective movements of said rack, said platform and said ejecting means whereby a row of cans is deposited on said platform, said platform is raised to form a guide, a second row of cans is deposited on said shelf and both rows of cans are ejected into a container.

14. In a machine of the character described provided with a can-holding rack adapted to receive and hold a plurality of rows of cans for ejecting into a container, said rack being provided with a shelf for holding a row of cans and a platform for holding a row of cans, means for moving relatively the platform with respect to the shelf so that a guide is formed for directing the second row of cans into said rack, and means for ejecting said cans from said rack into a container.

15. In a machine of the character described provided with a can-holding rack adapted to receive and hold a plurality of cans for ejecting into a case, an ejector mounted for reciprocal movement in the rack for ejecting the cans therefrom, means for moving said rack with relation to the chute discharging cans therein whereby plural stacks of rows of cans may be discharged into said rack, means arranged and adapted to control the movement of the ejector and the rack whereby short strokes of the rack are provided for loading purposes, and a relative long stroke of the ejector is provided for discharging the cans out of said rack into a case.

16. In a can-casing machine, means for stacking cans in a plurality of rows arranged one above the other in a movable rack, a rack into which cans may be stacked, means for moving said rack to accommodate said stacking whereby said cans are shifted with the rack in the direction of their axes, an operating mechanism for moving said rack in selective amount and at selective times, and means for ejecting said cans from said rack operated in timed relation with said selective means for operating said rack whereby said stacks of rows of cans are ejected into a container ejecting means operating in parallel alignment with the operation of said holding means.

17. In a can-casing machine, a movable can-holding rack adapted to hold a plurality of stacks of rows of cans, means for moving said rack in the direction of the axes of the cans stacked thereon a distance to accommodate stacks of rows of cans placed successively side by side, means for loading said rack with cans when in position to receive the same, means for expelling said stacks of rows of cans from said rack into a container, and means for bringing said rack to initial position for re-loading.

18. A can-casing machine comprising a can-holding rack adapted to hold a plurality of superposed rows of cans, a short stroke mechanism for moving said rack holding said rows of cans, a long stroke mechanism for expelling said rows of cans from said machine, means for varying the number of operations of said short stroke mechanism for each operation of said long stroke mechanism, runways for supplying said rack with cans, means for withholding cans on said runways, and means for operating said withholding means to release cans from said runways to said racks only when said rack is in position to receive cans from said runways and said long stroke mechanism is in a retracted position.

19. In a casing machine, a can-holding rack adapted to receive and hold cans for ejecting into a case, an ejector mounted for reciprocal movement in said rack for ejecting said cans therefrom into a case, means for holding said case in position for filling consisting of a case-holder bearing against said case and upon which said case may rest when removed from said machine, hydraulically operated means for operating said case-holder in timed relation with said ejecting means, and adjustable control means for operating said case-holder consisting of a by-pass valve whereby the speed of movement of said container away from said rack may be regulated.

20. In a casing machine provided with a can-holding movable rack adapted to receive and hold a plurality of cans for ejecting into a case, a hydraulically actuated ejector mounted for reciprocal movement in the rack for ejecting cans therefrom into a case and for moving said rack to position required for filling and ejecting purposes, a hydraulically operated case-support for holding said case in position to receive cans from said rack and to remove the case after being filled with cans to a position for removal from the machine, runways for supplying cans to said rack, means for controlling the delivery of cans from said runways, said means being hydraulically operated, and control means for the several above hydraulic appliances centrally located and operated in timed relation.

CHARLES H. WILD.